United States Patent
Kumar

(10) Patent No.: US 11,568,664 B2
(45) Date of Patent: Jan. 31, 2023

(54) SEPARATING DOCUMENTS BASED ON MACHINE LEARNING MODELS

(71) Applicant: SAP SE, Walldorf (DE)

(72) Inventor: Adithya Kumar, Redmond, WA (US)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 17/108,985

(22) Filed: Dec. 1, 2020

(65) Prior Publication Data

US 2022/0171965 A1    Jun. 2, 2022

(51) Int. Cl.
| | |
|---|---|
| G06V 30/413 | (2022.01) |
| G06N 20/00 | (2019.01) |
| G06K 9/62 | (2022.01) |
| G06N 5/04 | (2006.01) |

(52) U.S. Cl.
CPC ......... *G06V 30/413* (2022.01); *G06K 9/6217* (2013.01); *G06N 5/04* (2013.01); *G06N 20/00* (2019.01)

(58) Field of Classification Search
None
See application file for complete search history.

(56) References Cited

U.S. PATENT DOCUMENTS

2019/0163750 A1* 5/2019 Sage .................. G06N 3/08
2022/0171980 A1* 6/2022 Kumar ............... G06F 16/335

OTHER PUBLICATIONS

Bahdanau et al. "Neural Machine Translation by Jointly Learning to Align and Translate", ICLR 2015, 15 pages.

* cited by examiner

*Primary Examiner* — Dov Popovici
(74) *Attorney, Agent, or Firm* — Fountainhead Law Group P.C.

(57) ABSTRACT

Some embodiments provide a non-transitory machine-readable medium that stores a program executable by a device. The program receives a request to process a file. The file includes a set of images of text. The program further converts the text in each image in the set of images into a set of machine-readable text. The program also uses a machine learning model to predict, based on the set of machine-readable text, whether the set of images of the file are images of pages that belong to a single document or images of pages that belong to different documents.

20 Claims, 6 Drawing Sheets

300

Receiving a request to process a file, the file comprising a set of images of text — 310

Converting the text in each image in the set of images into machine-readable text — 320

Using a machine learning model to predict, based on the set of machine-readable text, whether the set of images of the file are images of pages that belong to a single document or images of pages that belong to different documents — 330

FIG. 3

SEPARATING DOCUMENTS BASED ON MACHINE LEARNING MODELS

BACKGROUND

As cloud computing systems and big data continue to grow at a rapid rate, the demand for fast and efficient document management systems also grows. In general, document management systems are used to receive, track, manage, and store documents. Often, documents that a document management system receives are parsed, examined, analyzed, sorted, modified, etc. before it can be managed and/or stored. Without optimizations to reduce the amount of resources required to process incoming documents or improve efficiency, document management systems can quickly become overwhelmed and sluggish as the amount of documents is handles increases.

SUMMARY

In some embodiments, a non-transitory machine-readable medium stores a program executable by at least one processing unit of a device. The program receives a request to process a file. The file includes a set of images of text. The program further converts the text in each image in the set of images into machine-readable text. The program also uses a machine learning model to predict, based on the set of machine-readable text, whether the set of images of the file are images of pages that belong to a single document or images of pages that belong to different documents.

In some embodiments, the request may be further to process a plurality of files that includes the file. Each file in the plurality of files may include a set of images of text. The program may further, for each file in the plurality of files other than the file, convert the text in each image in the set of images into machine-readable text and use the machine learning model to predict, based on the set of machine-readable text, whether the set of images of the file are images of pages that belong to a single document or images of pages that belong to different documents. The program may further, for each file in the plurality of files, determine a score associated with the file that indicates a confidence of the prediction; convert the scores associated with the plurality of files to a plurality of single document scores, wherein each single document score indicates a confidence that the set of images of the file are images of pages that belong to a single document; and determine the lowest single document score in the plurality of single document scores.

In some embodiments, the request may be received from a document manager service. The program may further determine a score associated with the file that indicates a confidence of the prediction and send the score to the document manager service. The machine learning model may be further used to determine the score associated with the document. The request may include a unique identifier (ID) for identifying the file. The program may further store the ID associated with the file, the machine-readable text, and the predictions in a storage. Converting the text in each image in the set of images may include sending the ID to a queue for processing by a service configured to convert the text in the image into the machine-readable text.

In some embodiments, a method receives a request to process a file. The file includes a set of images of text. The method further converts the text in each image in the set of images into machine-readable text. The method also uses a machine learning model to predict, based on the set of machine-readable text, whether the set of images of the file are images of pages that belong to a single document or images of pages that belong to different documents.

In some embodiments, the request may be further to process a plurality of files that includes the file. Each file in the plurality of files may include a set of images of text. The method may further, for each file in the plurality of files other than the file, convert the text in each image in the set of images into machine-readable text and use the machine learning model to predict, based on the set of machine-readable text, whether the set of images of the file are images of pages that belong to a single document or images of pages that belong to different documents. The method may further, for each file in the plurality of files, determine a score associated with the file that indicates a confidence of the prediction; convert the scores associated with the plurality of files to a plurality of single document scores, wherein each single document score indicates a confidence that the set of images of the file are images of pages that belong to a single document; and determine the lowest single document score in the plurality of single document scores.

In some embodiments, the request may be received from a document manager service. The method may further determine a score associated with the file that indicates a confidence of the prediction and send the score to the document manager service. The machine learning model may be further used to determine the score associated with the document. The request may include a unique identifier (ID) for identifying the file. The method may further storing the ID associated with the file, the machine-readable text, and the predictions in a storage. Converting the text in each image in the set of images may include sending the ID to a queue for processing by a service configured to convert the text in the image into the machine-readable text.

In some embodiments, a system includes a set of processing units and a non-transitory machine-readable medium that stores instructions. The instructions cause at least one processing unit to receive a request to process a file. The file includes a set of images of text. The instructions further cause the at least one processing unit to convert the text in each image in the set of images into machine-readable text. The instructions also cause the at least one processing unit to use a machine learning model to predict, based on the set of machine-readable text, whether the set of images of the file are images of pages that belong to a single document or images of pages that belong to different documents.

In some embodiments, the request may be further to process a plurality of files that includes the file. Each file in the plurality of files may include a set of images of text. The instructions may further cause the at least one processing unit to, for each file in the plurality of files other than the file, convert the text in each image in the set of images into machine-readable text and use the machine learning model to predict, based on the set of machine-readable text, whether the set of images of the file are images of pages that belong to a single document or images of pages that belong to different documents. The instructions may further cause the at least one processing unit to, for each file in the plurality of files, determine a score associated with the file that indicates a confidence of the prediction; convert the scores associated with the plurality of files to a plurality of single document scores, wherein each single document score indicates a confidence that the set of images of the file are images of pages that belong to a single document; and determine the lowest single document score in the plurality of single document scores.

In some embodiments, the request may be received from a document manager service. The instructions may further cause the at least one processing unit to determine a score associated with the file that indicates a confidence of the prediction and send the score to the document manager service. The machine learning model may be further used to determine the score associated with the document. The request may include a unique identifier (ID) for identifying the file. The instructions may further cause the at least one processor to store the ID associated with the file, the machine-readable text, and the predictions in a storage.

The following detailed description and accompanying drawings provide a better understanding of the nature and advantages of various embodiments of the present disclosure.

BRIEF DESCRIPTION OF THE DRAWINGS

FIG. 3 illustrates a process for separating documents according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for separating documents based on machine learning models. In some embodiments, a computing system includes a document manager and a multiple document manager. The multiple document manager is responsible for determining whether images included in a particular file are pages belonging to a single document (e.g., the same document) or whether they are pages belonging to multiple different documents. Thus, when the document manager wants to find out whether the images of a particular file belong to a single document or belong to multiple different documents, the document manager sends a request to the multiple document manager to make that determination. The multiple document manager gets text in the images of the document converted to machine-readable text. Then, a machine learning model is used to predict whether the pages of the file belong to a single document or to multiple different documents. Finally, the multiple document manager sends the prediction to the document manager.

The techniques described in the present application provide a number of benefits and advantages over conventional document separation systems. For instance, by using a machine learning model to predict whether the pages of a file belong to a single document or to multiple different documents, utilization of computing resources (e.g., processing power, memory, etc.) is reduced because the document separation process is only applied to files that are predicted to include pages that belong to different documents. Conventional document separation systems typically apply the document separation process to every file even if the pages of a file belong to the same document. This is because these systems are unable to determine whether the pages of a file belong to the same document.

Figure 1:
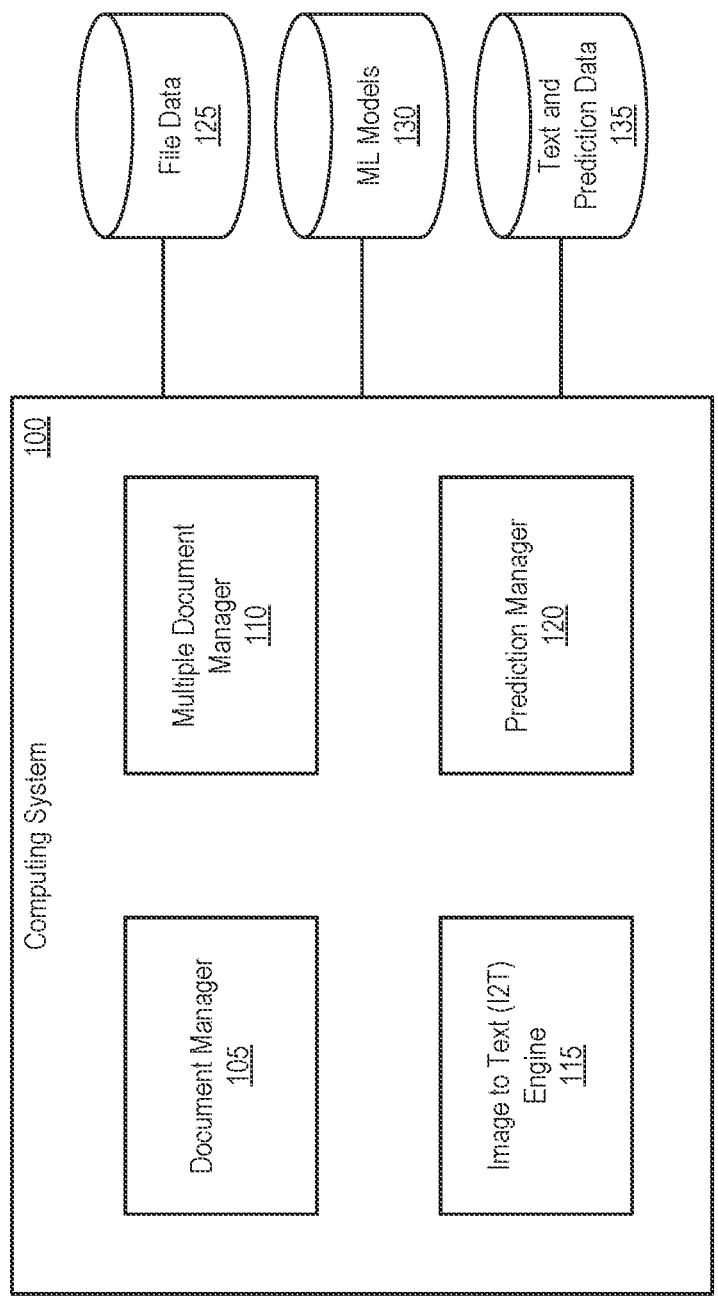
FIG. 1 illustrates a system for separating documents according to some embodiments.

FIG. 1 illustrates a system 100 for separating documents according to some embodiments. As shown, system 100 includes document manager 105, multiple document manager 110, image to text (I2T) engine 115, prediction manager 120, and storages 125-135. File data storage 125 is configured to store files and data associated with such files. In some embodiments, a file includes a set of images where each image in a set of images is an image of a page in a document. The set of images of a file may be pages belonging to a single document or pages belonging to different documents. For example, in some instances, a file can include images of pages that belong to a single invoice document. In other instances, a file can include images of pages that belong to different invoice documents.

Machine learning (ML) models storage 130 stores machine learning models. In some embodiments, the ML models stored in storage 130 are each configured to predict whether images included in a file belong to a single document or to multiple different documents. For instance, each ML model stored in ML models storage 130 could have been trained to predict whether images included in a file belong to a single document or to multiple different documents based on training data. An ML model stored in ML models storage 130 can be implemented using any number of different techniques. For example, an ML model may be a bidirectional long short-term memory (LSTM) neural network, a sequence to sequence model, a transformer, a recurrent neural network (RNN), etc. Text and prediction data storage 135 is configured to store information associated with files. Specifically, text and prediction data storage 135 may store machine-readable text generated from the images of files and predictions associated with files.

In some embodiments, storages 125-135 are implemented in a single physical storage while, in other embodiments, storages 125-135 may be implemented across several physical storages. While FIG. 1 shows storages 125-135 as external to computing system 100, one of ordinary skill in the art will appreciate that file data storage 125, ML models storage 130, and/or text and prediction data storage 135 may be part of computing system 100 in some embodiments.

Document manager 105 is responsible for managing documents. For instance, document manager 105 may receive files from client devices (not shown). In response to receiving a file from a client device, document manager 105 stores the file in file data storage 125 and determines a unique identifier (ID) identifying the file. Next, document manager 105 sends the ID to multiple document manager 110 along with a request to determine whether pages of the file belong to a single document or to multiple different documents. Document manager 105 may receive from multiple document manager 110 a score indicating the confidence of a prediction that the pages of the file belong to a single document. In some embodiments, the score that document manager 105 receives from multiple document manager 110 can be a value that ranges between 0-1 (e.g., 0.15, 0.38, 0.59, 0.88, 0.96, etc.). If the score falls below a defined threshold value, document manager 105 applies a document separation process to the file. Otherwise, document manager 105 continues processing the file without applying the document separation process to the file. Regardless of whether the document separation process is applied to a particular file, document manager 105 may perform (or instruct another component or computing device to perform) other operations on the particular file. Examples of such other operations include extracting contents from the particular file, storing the extracted contents in a storage, verifying the extracted contents, etc.

In some cases, document manager 105 receives from a client device a batch of files. For example, document manager 105 can receive an email that includes several files as attachments in the email. In some of these instances, document manager 105 sends the unique IDs identifying the files in the batch to multiple document manager 110 and a request to determine whether pages of the files belong to a single document or to multiple different documents. In response to the request, document manager 105 may receive from multiple document manager 110 a score indicating the confidence of a prediction that the pages of a file in the batch belong to a single document. If the score falls below a defined threshold value, document manager 105 applies a document separation process on the batch of files. If not, document manager 105 continues processing the batch of files without applying the document separation process on the batch of files.

While FIG. 1 shows document manager 105 as being part of computing system 100, one of ordinary skill in the art will appreciate that document manager 105 may be implemented on a separate computing device in some embodiments. For instance, in some embodiments, document manager 105 can be implemented on another computing device as a service that is configured to communicate with multiple document manager 110.

Multiple document manager 110 is configured to handle requests to determine whether pages of a file belong to a single document or to multiple different documents. For example, upon receiving such a request and an ID associated with a file from document manager 105, multiple document manager 110 sends I2T engine 115 the ID and a request to convert text in the images in the file to machine-readable text. Next, multiple document manager 110 can receive from prediction manager 120 a prediction and a score associated with the prediction. Alternatively, instead of receiving the prediction and score from prediction manager 120, multiple document manager 110 periodically checks text and prediction data storage 135 for the prediction and store associated with the file. Then, multiple document manager 110 forwards the prediction and score to document manager 105. In some embodiments, multiple document manager 110 converts the score to a single document score that represents the confidence of a prediction that the pages of the file belong to a single document. In some such embodiments, multiple document manager 110 sends document manager 105 the single document score instead of the prediction and the score associated with the prediction.

In some instances, multiple document manager 110 may receive from document manager 105 IDs associated with several files in a batch and a request to determine whether pages of the files belong to a single document or to multiple different documents. In response to such a request, multiple document manager 110 sends I2T engine 115 an ID associated with one of the files in the batch and a request to convert text in the images in the file to machine-readable text. Multiple document manager 110 sends a separate request and ID to I2T engine 115 for each file in the batch of files. Once multiple document manager 110 receives a prediction and a score for each file in the batch of files from prediction manager 120, multiple document manager 110 sends the predictions and scores to document manager 105. Alternatively, instead of receiving the predictions and scores from prediction manager 120, multiple document manager 110 periodically checks text and prediction data storage 135 for the predictions and stores associated with the files in the batch. In some embodiments, multiple document manager 110 converts each score to a single document score that represents the confidence of a prediction that the pages of the file belong to a single document. In some such embodiments, multiple document manager 110 determines the single document score that is the lowest and sends that one to document manager 105.

I2T engine 115 is configured to convert text in images to machine-readable text. For instance, I2T engine 115 can receive from multiple document manager 110 an ID associated with a file and a request to convert text in the images in the file to machine-readable text. In response, I2T engine 115 accesses file data storage 125 and retrieves the file based on the ID. Then, I2T engine 115 converts text in the images in the file to machine-readable text by extracting the text from the images in the file and generating a machine-readable version of the extracted text. I2T engine 115 may employ an optical character recognition (OCR) technique to perform these operations. Then, I2T engine 115 stores the machine-readable text along with the ID in text and prediction data storage 135. In addition, I2T engine 115 sends prediction manager 120 the machine-readable text, the ID, and a request to determine whether pages of the file with which the ID is associated belong to a single document or to multiple different documents.

In some embodiments, I2T engine 115 can be implemented as a service that is accessible through a set of application programming interfaces (APIs) provided by I2T engine 115. In some such embodiments, multiple document manager 110 sends an ID associated with a file to a queue (not shown in FIG. 1) that processes each ID in the queue by calling one or more APIs provided by I2T engine 115.

Prediction manager 120 processes requests for determining whether pages of a file belong to a single document or to multiple different documents. For example, prediction manager 120 can receive from I2T engine 115 machine-readable text, an ID associated with a file, and a request to determine whether pages of the file with which the ID is associated belong to a single document or to multiple different documents. In response, prediction manager 120 retrieves an ML model from ML models storage 130 and uses the ML model to predict whether pages of the file with which the ID is associated belong to a single document or to multiple different documents based on the machine-readable text. In some embodiments, the ML takes machine-readable text as input and generates as output a prediction indicating whether the machine-readable text belongs to a single document or to multiple different and a score indicating the confidence of the prediction. In some such embodiments, prediction manager 120 uses the ML model to make such a prediction by providing the machine-readable text as input to the machine learning model and receiving the prediction and score generated by the ML model. The score generated by the ML model may be a value that ranges between 0-1. Prediction manager 120 then stores the prediction and the score in text and prediction data storage 135. Alternatively, or in conjunction with storing the prediction and score in text and prediction data storage 135, prediction manager 120 sends the prediction and the score to multiple document manager 110.

Figure 2A:
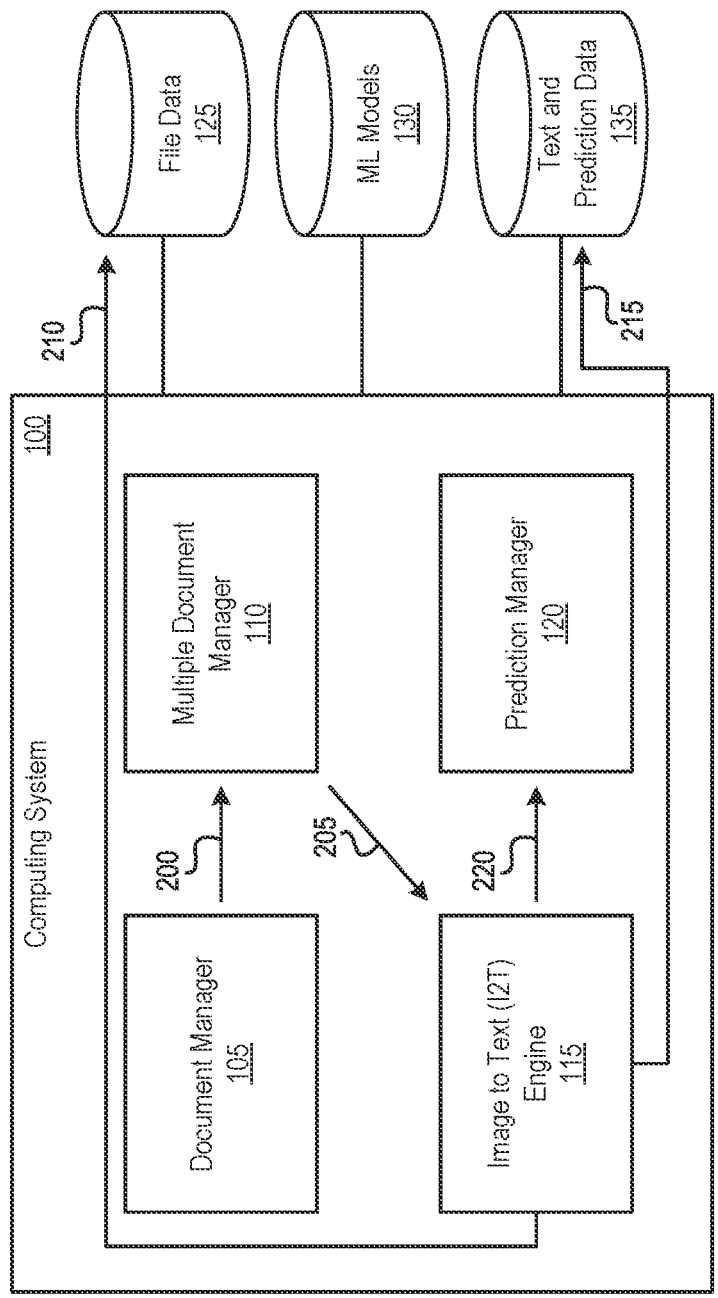
FIGS. 2A and 2B illustrate an example dataflow through the system illustrated in FIG. 1 according to some embodiments.
Figure 2B:
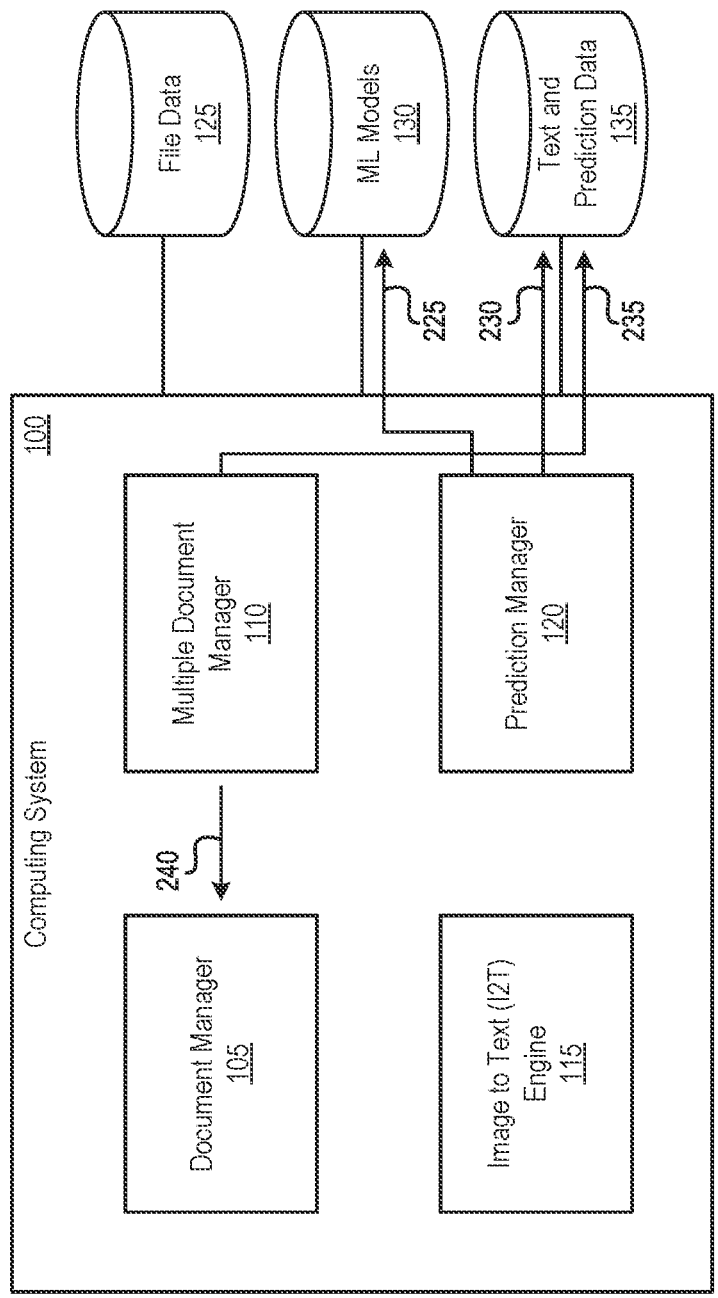

FIGS. 2A and 2B illustrate an example dataflow through system 100 according to some embodiments. For this example, document manager 105 has received from a client device a file that contains several images. Also, document manager 105 has stored the file in file data storage 125 and determined an ID associated with the file. FIG. 2A illustrates the beginning of the dataflow where document manager 105 sends, at 200, multiple document manager 110 the ID and a request to determine whether pages of the file belong to a single document or to multiple different documents. In response to receiving the ID and the request, multiple document manager 110 sends, at 205, I2T engine 115 the ID and a request to convert text in the images in the file to machine-readable text.

Upon receiving the ID and the request, I2T engine 115 accesses, at 210, file data storage 125 and retrieves the file based on the ID. I2T engine 115 then extracts text from the images in the file and generates a machine-readable version of the extracted text. Next, I2T engine 115 stores, at 215, the machine-readable text and the ID in text and prediction data storage 135. At 220, I2T engine 115 sends prediction manager 120 the machine-readable text, the ID, and a request to determine whether pages of the file with which the ID is associated belong to a single document or to multiple different documents.

Once prediction manager 120 receives from I2T engine 115 the machine-readable text, the ID associated with the file, and the request, prediction manager 120 retrieves, as shown in FIG. 2B at 225, an ML model from ML models storage 130. Then, prediction manager 120 uses the ML model to predict whether pages of the file with which the ID is associated belong to a single document or to multiple different documents based on the machine-readable text. In this example, prediction manager 120 provides the machine-readable text as input to the machine learning model. The ML model generates a prediction indicating whether the machine-readable text belongs to a single document or to multiple different and a score indicating the confidence of the prediction. As mentioned above, a score generated by the ML model can be a value that ranges between 0-1. Prediction manager 120 receives the prediction and the score from the ML model and stores, at 230, them in text and prediction data storage 135.

Document manager 110 periodically checks text and prediction data storage 135 to see if the prediction and score associated with the ID are there. When that data is available in text and prediction data storage 135, multiple document manager 110 retrieves, at 235, it from storage 135. For this example, multiple document manager 110 converts the score to a single document score that represents the confidence of a prediction that the pages of the file belong to a single document. For instance, if the prediction is that the machine-readable text (i.e., the pages of the file) belongs to multiple different documents and the confidence score for that prediction is 0.75, multiple document manager 110 converts the score by subtracting the score for the prediction from 1 to get a single document score of 0.25. If the prediction is that the machine-readable text belongs to a single document and the confidence score for that prediction is 0.6, then the single document score is the same as the confidence score for the prediction (0.6 in this example) and no calculations are needed to be performed on the confidence score.

FIG. 3 illustrates a process 300 for separating documents according to some embodiments. In some embodiments, computing system 100 performs process 300. Process 300 starts by receiving, at 310, a request to process a file. The file includes a set of images of text. Referring to FIGS. 1 and 2A as an example, multiple document manager 110 may receive a request to process a file, which includes several images, from document manager 105.

Next, process 300 converts, at 320, the text in each image in the set of images into machine-readable text. Referring to FIGS. 1 and 2A as an example, multiple document manager 110 can send I2T engine 115 a request to convert text in the images of the file to machine-readable text. In response to the request, I2T engine 115 extracts the text in the images of the file and generates machine-readable text based on the extracted text. I2T engine 115 stores the machine-readable text in text and prediction data storage 135.

Finally, process 300 uses, at 330, a machine learning model to predict, based on the set of machine-readable text, whether the set of images of the file are images of pages that belong to a single document or images of pages that belong to different documents. Referring to FIGS. 1 and 2B as an example, prediction manager 120 may retrieve an ML model from ML models storage 130. Then, prediction manager 120 provides the machine-readable text as input to the machine learning model and receives a prediction whether the images of the file are pages that belong to a single document or pages that belong to different documents as well as a score indicating the confidence of the prediction.

Figure 4:
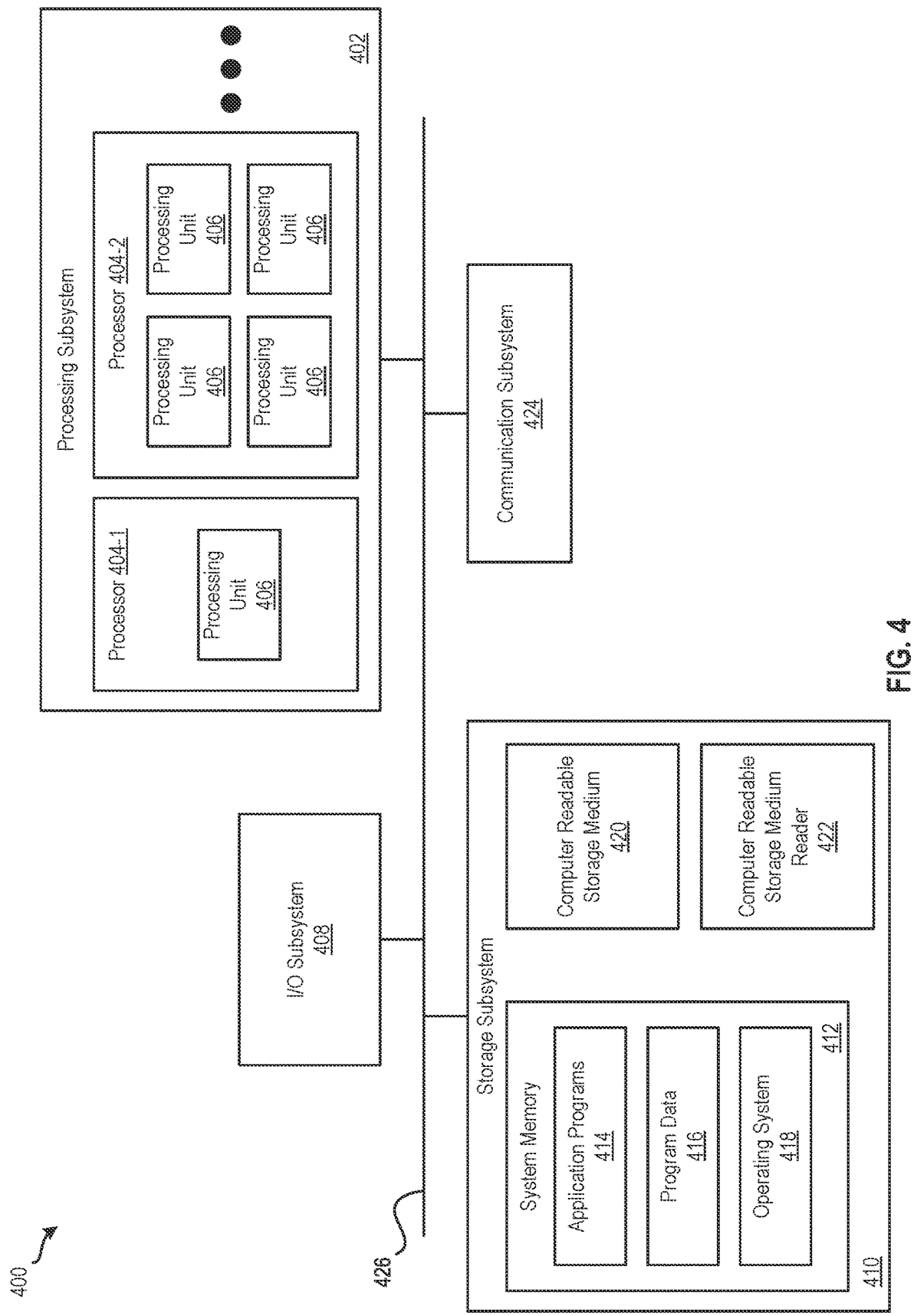
FIG. 4 illustrates an exemplary computer system, in which various embodiments may be implemented.

FIG. 4 illustrates an exemplary computer system 400 for implementing various embodiments described above. For example, computer system 400 may be used to implement computing system 100. Computer system 400 may be a desktop computer, a laptop, a server computer, or any other type of computer system or combination thereof. Some or all elements of document manager 105, multiple document manager 110, I2T engine 115, prediction manager 120, or combinations thereof can be included or implemented in computer system 400. In addition, computer system 400 can implement many of the operations, methods, and/or processes described above (e.g., process 300). As shown in FIG. 4, computer system 400 includes processing subsystem 402, which communicates, via bus subsystem 426, with input/output (I/O) subsystem 408, storage subsystem 410 and communication subsystem 424.

Bus subsystem 426 is configured to facilitate communication among the various components and subsystems of computer system 400. While bus subsystem 426 is illustrated in FIG. 4 as a single bus, one of ordinary skill in the art will understand that bus subsystem 426 may be implemented as multiple buses. Bus subsystem 426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 402, which can be implemented as one or more integrated circuits (e.g., a conventional microprocessor or microcontroller), controls the operation of computer system 400. Processing subsystem 402 may include one or more processors 404. Each processor 404 may include one processing unit 406 (e.g., a single core processor such as processor 404-1) or several processing units 406 (e.g., a multicore processor such as processor 404-2). In some embodiments, processors 404 of processing subsystem 402 may be implemented as independent processors while, in other embodiments, processors 404 of processing subsystem 402 may be implemented as multiple processors integrate into a single chip or multiple chips. Still, in some embodiments, processors 404 of processing subsystem 402 may be implemented as a combination of independent processors and multiple processors integrated into a single chip or multiple chips.

In some embodiments, processing subsystem 402 can execute a variety of programs or processes in response to program code and can maintain multiple concurrently executing programs or processes. At any given time, some or all of the program code to be executed can reside in processing subsystem 402 and/or in storage subsystem 410. Through suitable programming, processing subsystem 402 can provide various functionalities, such as the functionalities described above by reference to process 300, etc.

I/O subsystem 408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 400 to a user or another device (e.g., a printer).

As illustrated in FIG. 4, storage subsystem 410 includes system memory 412, computer-readable storage medium 420, and computer-readable storage medium reader 422. System memory 412 may be configured to store software in the form of program instructions that are loadable and executable by processing subsystem 402 as well as data generated during the execution of program instructions. In some embodiments, system memory 412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 412 may include different types of memory, such as static random access memory (SRAM) and/or dynamic random access memory (DRAM). System memory 412 may include a basic input/output system (BIOS), in some embodiments, that is configured to store basic routines to facilitate transferring information between elements within computer system 400 (e.g., during start-up). Such a BIOS may be stored in ROM (e.g., a ROM chip), flash memory, or any other type of memory that may be configured to store the BIOS.

As shown in FIG. 4, system memory 412 includes application programs 414, program data 416, and operating system (OS) 418. OS 418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 420 may be a non-transitory computer-readable medium configured to store software (e.g., programs, code modules, data constructs, instructions, etc.). Many of the components (e.g., document manager 105, multiple document manager 110, I2T engine 115, and prediction manager 120) and/or processes (e.g., process 300) described above may be implemented as software that when executed by a processor or processing unit (e.g., a processor or processing unit of processing subsystem 402) performs the operations of such components and/or processes. Storage subsystem 410 may also store data used for, or generated during, the execution of the software.

Storage subsystem 410 may also include computer-readable storage medium reader 422 that is configured to communicate with computer-readable storage medium 420. Together and, optionally, in combination with system memory 412, computer-readable storage medium 420 may comprehensively represent remote, local, fixed, and/or removable storage devices plus storage media for temporarily and/or more permanently containing, storing, transmitting, and retrieving computer-readable information.

Computer-readable storage medium 420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 424 serves as an interface for receiving data from, and transmitting data to, other devices, computer systems, and networks. For example, communication subsystem 424 may allow computer system 400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 424 may provide components configured for wired communication (e.g., Ethernet) in addition to or instead of components configured for wireless communication.

One of ordinary skill in the art will realize that the architecture shown in FIG. 4 is only an example architecture of computer system 400, and that computer system 400 may have additional or fewer components than shown, or a different configuration of components. The various components shown in FIG. 4 may be implemented in hardware, software, firmware or any combination thereof, including one or more signal processing and/or application specific integrated circuits.

Figure 5:
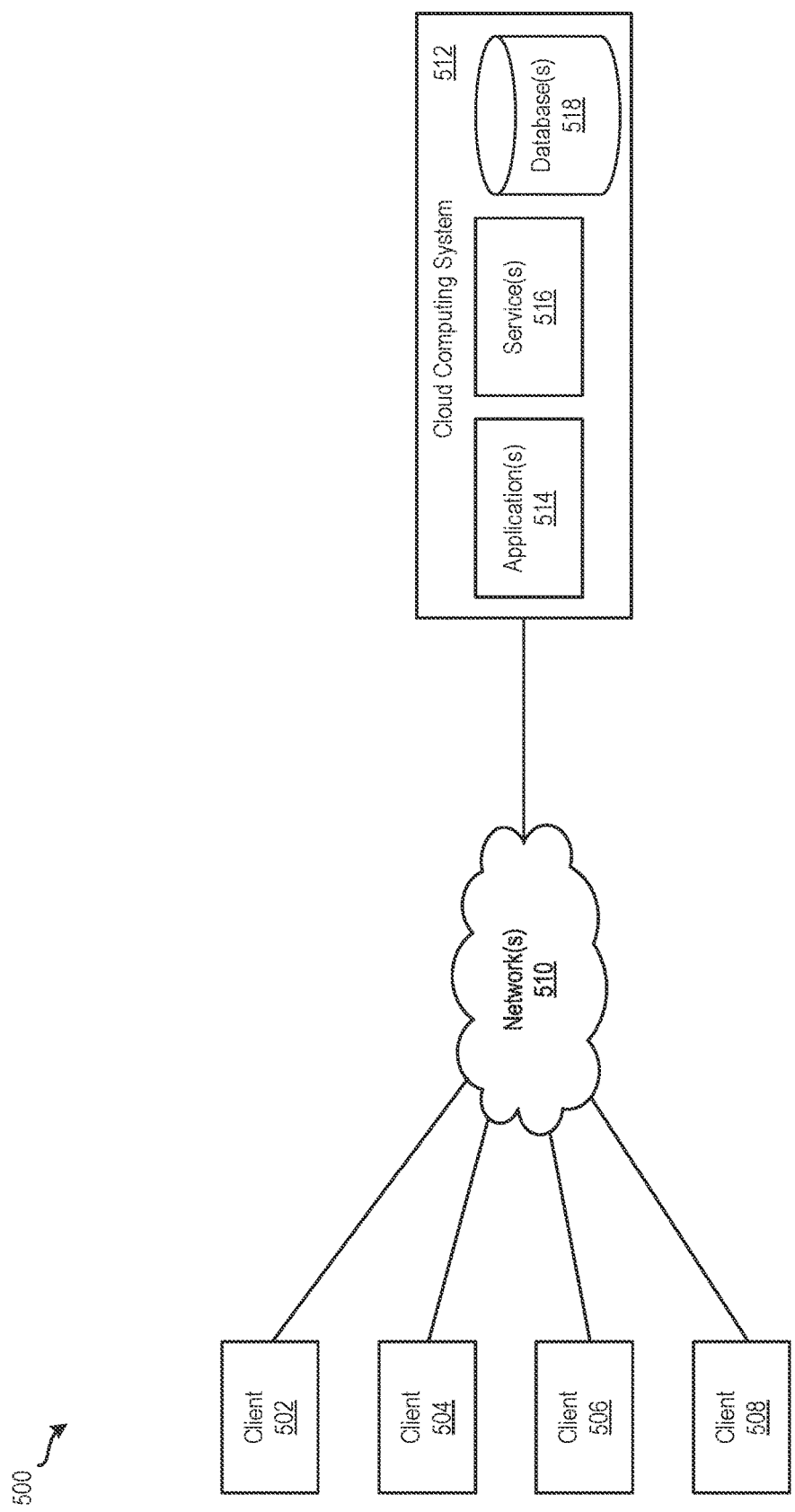
FIG. 5 illustrates an exemplary system, in which various embodiments may be implemented.

FIG. 5 illustrates an exemplary system 500 for implementing various embodiments described above. For example, cloud computing system 512 may be used to implement computing system 100. As shown, system 500 includes client devices 502-508, one or more networks 510, and cloud computing system 512. Cloud computing system 512 is configured to provide resources and data to client devices 502-508 via networks 510. In some embodiments, cloud computing system 500 provides resources to any number of different users (e.g., customers, tenants, organizations, etc.). Cloud computing system 512 may be implemented by one or more computer systems (e.g., servers), virtual machines operating on a computer system, or a combination thereof.

As shown, cloud computing system 512 includes one or more applications 514, one or more services 516, and one or more databases 518. Cloud computing system 500 may provide applications 514, services 516, and databases 518 to any number of different customers in a self-service, subscription-based, elastically scalable, reliable, highly available, and secure manner.

In some embodiments, cloud computing system 500 may be adapted to automatically provision, manage, and track a customer's subscriptions to services offered by cloud computing system 500. Cloud computing system 500 may provide cloud services via different deployment models. For example, cloud services may be provided under a public cloud model in which cloud computing system 500 is owned by an organization selling cloud services and the cloud services are made available to the general public or different industry enterprises. As another example, cloud services may be provided under a private cloud model in which cloud computing system 500 is operated solely for a single organization and may provide cloud services for one or more entities within the organization. The cloud services may also be provided under a community cloud model in which cloud computing system 500 and the cloud services provided by cloud computing system 500 are shared by several organizations in a related community. The cloud services may also be provided under a hybrid cloud model, which is a combination of two or more of the aforementioned different models.

In some instances, any one of applications 514, services 516, and databases 518 made available to client devices 502-508 via networks 510 from cloud computing system 500 is referred to as a "cloud service." Typically, servers and systems that make up cloud computing system 500 are different from the on-premises servers and systems of a customer. For example, cloud computing system 500 may host an application and a user of one of client devices 502-508 may order and use the application via networks 510.

Applications 514 may include software applications that are configured to execute on cloud computing system 512 (e.g., a computer system or a virtual machine operating on a computer system) and be accessed, controlled, managed, etc. via client devices 502-508. In some embodiments, applications 514 may include server applications and/or mid-tier applications (e.g., HTTP (hypertext transport protocol) server applications, FTP (file transfer protocol) server applications, CGI (common gateway interface) server applications, JAVA server applications, etc.). Services 516 are software components, modules, application, etc. that are configured to execute on cloud computing system 512 and provide functionalities to client devices 502-508 via networks 510. Services 516 may be web-based services or on-demand cloud services.

Databases 518 are configured to store and/or manage data that is accessed by applications 514, services 516, and/or client devices 502-508. For instance, storages 125-135 may be stored in databases 518. Databases 518 may reside on a non-transitory storage medium local to (and/or resident in) cloud computing system 512, in a storage-area network (SAN), on a non-transitory storage medium local located remotely from cloud computing system 512. In some embodiments, databases 518 may include relational databases that are managed by a relational database management system (RDBMS). Databases 518 may be a column-oriented databases, row-oriented databases, or a combination thereof. In some embodiments, some or all of databases 518 are in-memory databases. That is, in some such embodiments, data for databases 518 are stored and managed in memory (e.g., random access memory (RAM)).

Client devices 502-508 are configured to execute and operate a client application (e.g., a web browser, a proprietary client application, etc.) that communicates with applications 514, services 516, and/or databases 518 via networks 510. This way, client devices 502-508 may access the various functionalities provided by applications 514, services 516, and databases 518 while applications 514, services 516, and databases 518 are operating (e.g., hosted) on cloud computing system 500. Client devices 502-508 may be computer system 400, as described above by reference to FIG. 4. Although system 500 is shown with four client devices, any number of client devices may be supported.

Networks 510 may be any type of network configured to facilitate data communications among client devices 502-508 and cloud computing system 512 using any of a variety of network protocols. Networks 510 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving a request to process a file, the file comprising a set of images of text;
converting the text in each image in the set of images into a set of machine-readable text; and
using a machine learning model to predict, based on the set of machine-readable text, whether the set of images of the file are images of pages that belong to a single document or images of pages that belong to different documents.

2. The non-transitory machine-readable medium of claim 1, wherein the request is further to process a plurality of files that includes the file, wherein each file in the plurality of files comprises a set of images of text, wherein the program further comprises a set of instruction for:

for each file in the plurality of files other than the file, converting the text in each image in the set of images into machine-readable text and using the machine learning model to predict, based on the set of machine-readable text, whether the set of images of the file are images of pages that belong to a single document or images of pages that belong to different documents.

3. The non-transitory machine-readable medium of claim 2, wherein the program further comprises set of instructions for:

for each file in the plurality of files, determining a score associated with the file that indicates a confidence of the prediction;

converting the scores associated with the plurality of files to a plurality of single document scores, wherein each single document score indicates a confidence that the set of images of the file are images of pages that belong to a single document; and determining a lowest single document score in the plurality of single document scores.

4. The non-transitory machine-readable medium of claim 1, wherein the request is received from a document manager service, wherein the program further comprises sets of instructions for:

determining a score associated with the file that indicates a confidence of the prediction; and sending the score to the document manager service.

5. The non-transitory machine-readable medium of claim 4, wherein the machine learning model is further used to determine the score associated with the file.

6. The non-transitory machine-readable medium of claim 1, wherein the request comprises a unique identifier (ID) for identifying the file, wherein the program further comprises a set of instructions for storing the ID associated with the file, the set of machine-readable text, and the prediction in a storage.

7. The non-transitory machine-readable medium of claim 6, wherein converting the text in each image in the set of images comprises sending the ID to a queue for processing by a service configured to convert the text in the image into the set of machine-readable text.

8. A method comprising:

receiving a request to process a file, the file comprising a set of images of text;

converting the text in each image in the set of images into a set of machine-readable text; and using a machine learning model to predict, based on the set of machine-readable text, whether the set of images of the file are images of pages that belong to a single document or images of pages that belong to different documents.

9. The method of claim 8, wherein the request is further to process a plurality of files that includes the file, wherein each file in the plurality of files comprises a set of images of text, wherein the method further comprises:

for each file in the plurality of files other than the file, converting the text in each image in the set of images into machine-readable text and using the machine learning model to predict, based on the set of machine-readable text, whether the set of images of the file are images of pages that belong to a single document or images of pages that belong to different documents.

10. The method of claim 9 further comprising:

for each file in the plurality of files, determining a score associated with the file that indicates a confidence of the prediction;

converting the scores associated with the plurality of files to a plurality of single document scores, wherein each single document score indicates a confidence that the set of images of the file are images of pages that belong to a single document; and determining a lowest single document score in the plurality of single document scores.

11. The method of claim 8, wherein the request is received from a document manager service, wherein the method further comprises:

determining a score associated with the file that indicates a confidence of the prediction; and sending the score to the document manager service.

12. The method of claim 11, wherein the machine learning model is further used to determine the score associated with the file.

13. The method of claim 8, wherein the request comprises a unique identifier (ID) for identifying the file, wherein the method further comprises storing the ID associated with the file, the set of machine-readable text, and the prediction in a storage.

14. The method of claim 13, wherein converting the text in each image in the set of images comprises sending the ID to a queue for processing by a service configured to convert the text in the image into the set of machine-readable text.

15. A system comprising:

a set of processing units; and a non-transitory machine-readable medium storing instructions that when executed by at least one processing unit in the set of processing units cause the at least one processing unit to:

receive a request to process a file, the file comprising a set of images of text;

convert the text in each image in the set of images into a set of machine-readable text; and use a machine learning model to predict, based on the set of machine-readable text, whether the set of images of the file are images of pages that belong to a single document or images of pages that belong to different documents.

16. The system of claim 15, wherein the request is further to process a plurality of files that includes the file, wherein each file in the plurality of files comprises a set of images of text, wherein the instructions further cause the at least one processing unit to:

for each file in the plurality of files other than the file, convert the text in each image in the set of images into a set of machine-readable text and use the machine learning model to predict, based on the set of machine-readable text, whether the set of images of the file are images of pages that belong to a single document or images of pages that belong to different documents.

17. The system of claim 16, wherein the instructions further cause the at least one processing unit to:

for each file in the plurality of files, determine a score associated with the file that indicates a confidence of the prediction;

convert the scores associated with the plurality of files to a plurality of single document scores, wherein each single document score indicates a confidence that the set of images of the file are images of pages that belong to a single document; and determine a lowest single document score in the plurality of single document scores.

18. The system of claim 15, wherein the request is received from a document manager service, wherein the instructions further cause the at least one processing unit to:

determine a score associated with the file that indicates a confidence of the prediction; and send the score to the document manager service.

19. The system of claim 18, wherein the machine learning model is further used to determine the score associated with the file.

20. The system of claim 15, wherein the request comprises a unique identifier (ID) for identifying the file, wherein the instructions further cause the at least one processing unit to store the ID associated with the file, the set of machine-readable text, and the prediction in a storage.

* * * * *